United States Patent [19]

Du

[11] 4,211,826

[45] Jul. 8, 1980

[54] PRESSURE SENSITIVE TRANSFER MEDIA

[76] Inventor: Elbert Du, 417 E. 7th St., Cincinnati, Ohio 45201

[21] Appl. No.: 947,632

[22] Filed: Oct. 2, 1978

Related U.S. Application Data

[63] Continuation of Ser. No. 781,117, Mar. 25, 1977, abandoned.

[51] Int. Cl.$^2$ ......................... B32B 27/00; B41M 3/12

[52] U.S. Cl. ................................. 428/497; 252/62.54; 252/62.56; 427/128; 427/146; 428/329; 428/522; 428/532; 428/539; 428/900; 428/914

[58] Field of Search ............... 428/403, 407, 323, 532, 428/900, 914, 329, 408, 507-510, 481, 539; 156/240; 252/62.54, 62.56; 427/128, 146

[56] References Cited

U.S. PATENT DOCUMENTS

| | | | |
|---|---|---|---|
| 2,744,031 | 5/1956 | Mumma | 428/914 X |
| 3,677,817 | 7/1972 | Muri | 428/329 |
| 3,776,864 | 12/1973 | Woerner | 428/914 |
| 4,132,835 | 1/1979 | Du | 428/522 |

*Primary Examiner*—Paul J. Thibodeau

[57] ABSTRACT

Pressure sensitive image transfer media in the form of a thin film substance having a thin layer thereon comprising the solvent evaporated residue of a liquid mixture made up of substantially equal amounts of ethyl hydroxyl ethyl cellulose and a second resin incompatible therewith in association with a solvent immiscible vehicle modifier of a character incompatible with both of said polymers.

5 Claims, No Drawings

PRESSURE SENSITIVE TRANSFER MEDIA

This is a continuation of application Ser. No. 781,117filed Mar. 25, 1977, now abandoned.

This invention relates to improved pressure sensitive image transfer media and particularly to improved transfer media for pressure induced transfer of magnetic or optically sensible images.

Pressure sensitive image transfer media of diverse character are widely employed in the duplicating arts. The increasing utilization of electronic data processing equipment and the attendant utilization of automatic mark-sensing for data input thereto have created a continued demand for improved transfer media that provides transferred images of a character that maintain a high degree of transferred image definition and intensity under conditions of repeated automated usage over extended periods of time. In particular, there presently exists a need for improved pressure sensitive transfer media that will provide highly smear and smudge resistant magnetically and/or optically sensible transfer images with a markedly increased degree of definition and intensity to the end of producing and reproducing, over extended periods of time, and under conditions of repetitive usage, effectively indentical signal levels with a high degree of discrimination in automatic sensing equipment.

As is recognized in the transfer media art, the attaining of the conjoint objectives of a high degree of smudge and smear resistance, sharpness of transfer and high intensity of transferred image as well as a high degree of adhesion to the carrier and receptor substrates with a concomitant ready transfer of substantially all of the imaging material in response to a predetermined level and pattern of applied pressure constitute essentially antithetical requirements and the presence of a greater degree of one such advantageous characteristic can normally be obtained only at the expense of the others.

This invention may be briefly described as an improved pressure sensitive optically and/or magnetically sensible image transfer media comprising a single layer of transferrable sensible coating composition disposed on a thin film substrate. In its broad aspects, the subject invention includes a substrate having a thin layer thereon constituted by the solvent evaporated residue of a selectively constituted liquid mixture incorporating substantially equal amounts of two mutually incompatible resinous polymers, an immiscible vehicle modifier of a character incompatible with either of said polymers and particulate sensible material uniformly dispersed therewithin.

Among the disadvantages of the subject invention is the provision of single layer pressure sensitive transfer media of improved clear and smudge free character for effecting the selective transfer of highly smear and smudge resistant optical and/or magnetically sensible images. Still other advantages include the permitted transfer of images having a high degree of definition and intensity and which are capable of producing and reproducing, over extended periods of time and under conditions of repetitive usage, effectively identical signal levels with a high degree of discrimination in automatic sensing equipment. Still other advantages include the provision of magnetically and/or optically sensible images of enduring quality with minimal degradation of discrimination attendant repetitive usage thereof.

The object of this invention is the provision of an improved single layer magnetic and/or optically sensible image transfer media.

Other objects and advantages will become apparent from the following portions of this specification which delineate and describe presently preferred embodiments of magnetic and/or optically sensible image transfer media formulated in accord with the principles of this invention.

In the broader aspects of the practice of the subject invention, a thin layer of a suspension of particulate and finely divided optically and/or magnetically sensible material uniformly dispersed in a specially constituted mixture made up of substantially equal amounts of two mutually incompatible resinous polymers one of which is cellulosic in character and a solvent immiscible vehicle modifier of a character incompatible to either of said copolymers in an evaporable solvent is applied to a carrier substrate film of synthetic resinous material, after which the solvent is evaporated to leave an improved single layer image transfer film as the residuum thereof.

The first resin or polymer, which is cellulosic in nature, consists of a low or extra low viscosity mixed cellulose ester, specifically ethyl hydroxyl ethyl cellulose. A presently preferred material is Hercules Inc.'s EHCH-Extra Low Viscosity. Such material is possessed of an unusual solubility tolerance for aliphatic hydrocarbons, has a viscosity of about 10–20 cps (at 5% concentration by weight and at 25° C. in 80:20 toluene:ethanol) and comprises colorless and odorless granules having a bulk density of from 19 to 22 lbs./cu. ft.; a specific volume in solution of 24.5 cu. in./lb.; an unplasticized flow temperature (ASTM D-569-48) of over 175° C. and a film density of 1.12 g./cc.

The second and mutually incompatible resinous polymer is selected from the group consisting of low to medium molecular weight methyl methacrylate and cellulose acetate butyrate having an average range of 20.5% acetyl, 26% butyral to 29.5% acetyl, 17% butyral.

Presently preferred low and medium molecular weight methyl methacrylate resins suitably comprise DuPont's ELVACITE bead polymers 2008, 2009 and 2010 available as minute spherical beads. Such low and medium molecular weight resins are thermoplastic and thermally stable up to 350°–450° F., well above their softening range. Such resins are also possessed of a Tukon hardness, Knoop of 17–19, an inherent viscosity (Solution of 0.25 g polymer in 50 ml. chloroform at 20° C. using a No. 50 Cannon-Fenshe Viscosmeter) of from about 0.20 to 0.45 and a density of 9.54 to 9.98 (lb resin/-gal resin as calculated from density (ASTM D-1475) of 20% solution in methyl ethyl ketone).

Presently preferred cellulose acetate butyrate polymer suitably comprises Eastman Chemical Products mixed cellulose acetate butyrates CAB 171 and 272. The CAB 171 material has an average acetyl content of 29.5% and a butyryl content of 17%, a hydroxyl content of about 1.5% a melting range of from 230°–240° C., a Tukon hardness Knoops of 16 and a weight of 10.5 lbs. per U.S. gallon. The CAB 272 material has an average acetyl content of 20.5, a butyryl content of 26%, hydroxyl content of about 2.7%, a melting range of 205°–220° C., Tukon hardness of 13 and a weight of 10.42 lbs. per U.S. gallon.

The polymer incompatible and solvent immiscible modifier is selected from the group consisting of epoxidized soy bean oil of high molecular weight and lard oil.

A preferred epoxidized soy bean oil is manufactured and sold by the C. P. Hall Co. as a clear viscous liquid characterized by a maximum saponification number of about 180, a flash point (C.O.C.) of 570° F., a freezing point of 5° C., a viscosity of 325 centipose at 25° C., a surface tension of 34 dynes/cm. at 20° C., a general insolubility in most inorganic solvents in contrast to an effectively complete solubility in mineral oil and gasoline at 25° C. and a specific gravity in the range of 0.987 to 0.997.

A preferred lard oil comprises Pface's Peacock as sold by George Pface Sons & Co. of Jeffersonville Indiana. Such lard oil contains about 2% free fatty acids, has an acid number of 4, a saponification number of about 190-200 and an iodine number of about 62-75. It is also characterized by a pour point of 45° F., an open cup flash point of 550° F., an open cup free point of 660° F. a viscosity of 190-210 at 100° F. and a specific gravity of 0.910-0.920.

The presently preferred evaporable solvent comprises methyl ethyl ketone although other solvents such as ethyl acetate may be employed.

The sensible imaging material may be of magnetic and/or optically sensible character suitable magnetically sensible material includable in the transfer layer may constitute any of the well known magnetically responsive materials and the utilization of finely divided magnetic iron oxide of a density of about 4.8 and oil absorbtion of about 50 g/100 g in amounts varying between about 35-40% of the finished transfer coating is presently preferred. Optically sensible material may suitably comprise carbon black. Graphite is optimally includable in coating mixtures of both the magnetically or optically sensible types to enhance the release characteristics of the transferable material and the amount of graphite is in the range of 7 to 16 parts.

Likewise, a small amount of a selective plasticizer for the ethyl hydroxyl ethyl cellulose resinous component may be optimally employed. Tri cresyl phosphate is a presently preferred selective plasticizer for such first resin component.

In the production of pressure sensitive magnetically sensible image transfer media in accord with the principles of this invention, a liquid mixture is formed by adding substantially equal proportions, suitably about 2.5 to about 6 parts each of ethyl hydroxyl ethyl cellulose as the first resin and a second resin selected from the group consisting of cellulose acetate butyrate and methyl methacrylate; about 10 to 14 parts of sensible material such as magnetic iron oxide, carbon black and graphite and about 10 to 20 parts of an incompatible modifier selected from the group consisting of epoxidized soy bean oil and lard oil, to 60 to 70 parts of evaporable solvent, preferably methyl ethyl ketone. Such mixture is agitated to obtain a uniform dispersion of the constituents therein. If desired, a small amount, such as 0.5 to 1.0% of tricresyl phosphate is also added to the solution to selectively serve as a plasticizer for the ethyl hydroxyl ethyl cellulose first resin component. Such liquid mixture is then applied as a thin film to one surface of a thin polyethylene or polyester film and subjected to heat to evaporate the solvent component therefrom. The residuum of the applied liquid film constitutes a transfer film or layer of improved characteristics as earlier described. The finished film, assuming substantially complete evaporation of the solvent, will be constituted of about 9 to 20 parts of the first polymer, i.e. ethyl hydroxyl ethyl cellulose, a substantially equal amount of the second and mutually incompatible resinous polymer selected from the group consisting of methyl methacrylate and cellulose acetate butyrate, about 20 to 45 parts of optically and/or magnetically sensible material including any graphite additive thereto and about 30 to 55 parts of the solvent immiscible vehicle modifier selected from the group consisting of epoxidized soy bean oil and lard oil.

In the preferred practice of the invention the carrier substrate film is desirable constituted of a thin flexible film, suitably of ribbon like character of polyethylene or of polyester and whose particular physical characteristics will be determined, at least in part, by the nature of the applied pressure patterns of the contemplated mode of usage thereof.

By way of specific example, the following formulations have provided pressure sensitive magnetic and/or optically sensible image transfer media of improved character, the dry basis formulations assuming the presence of no evaporated solvent in the coating:

| Example 1 | Wet Basis | Finished Coating (Dry Basis) |
|---|---|---|
| Magnetic iron oxide | 10 | 29.4 |
| Ethyl hydroxyl ethyl cellulose | 6.0 | 17.64 |
| Methyl methacrylate | 6.0 | 17.64 |
| Lard oil | 12.0 | 35.29 |
| Methyl ethyl ketone | 66.0 | |
| Example 2 | | |
| Magnetic iron oxide | 12.0 | 33.33 |
| Ethyl hydroxyl ethyl cellulose | 6.0 | 16.66 |
| Methyl methacrylate | 6.0 | 16.66 |
| Lard oil | 12.0 | 33.33 |
| Methyl ethyl ketone | 66.0 | — |
| Example 3 | | |
| Magnetic iron oxide | 13.5 | 40.29 |
| Ethyl hydroxyl ethyl cellulose | 3.0 | 8.95 |
| Methyl methacrylate | 3.0 | 8.95 |
| Lard oil | 14.0 | 41.79 |
| Methyl ethyl ketone | 66.5 | — |
| Example 4 | | |
| Magnetic iron oxide | 12.0 | 30.76 |
| Ethyl hydroxyl ethyl cellulose | 6.0 | 15.38 |
| Methyl methacrylate | 6.0 | 15.38 |
| Lard oil | 12.0 | 30.76 |
| Graphite | 3.0 | 7.69 |
| Methyl ethyl ketone | 61.0 | — |
| Example 5 | | |
| Magnetic iron oxide | 12.0 | 37.6 |
| Ethyl hydroxyl ethyl cellulose | 6.0 | 15.38 |
| Methyl methacrylate | 6.0 | 15.38 |
| Epoxidized soy bean oil | 12.0 | 30.76 |
| Graphite | 3.0 | 7.69 |
| Methyl ketone | 61.0 | — |
| Example 6 | | |
| Magnetic iron oxide | 14.0 | 22.22 |

-continued

| Example 1 | Wet Basis | Finished Coating (Dry Basis) |
|---|---|---|
| Ethyl hydroxyl ethyl cellulose | 3.5 | 9.45 |
| Cellulose acetate butyrate | 3.5 | 9.45 |
| Epoxidized soy bean oil | 16.0 | 43.24 |
| Methyl ethyl ketone | 63.0 | — |
| Example 7 | | |
| Magnetic iron oxide | 12.0 | 40.0 |
| Ethyl hydroxyl ethyl cellulose | 3.0 | 10.0 |
| Cellulose acetate butyrate | 3.0 | 10.0 |
| Lard oil | 12.0 | 40.0 |
| Methyl ethyl ketone | 70.0 | — |
| Example 8 | | |
| Carbon black | 5 | 15.5 |
| Graphite | 5 | 15.5 |
| Ethyl hydroxyl ethyl cellulose | 3.5 | 10.6 |
| Cellulose acetate butyrate | 3.5 | 10.6 |
| Epoxidized soy bean oil | 16.0 | 48.48 |
| Methyl ethyl ketone | 67.0 | — |
| Example 9 | | |
| Magnetic iron oxide | 13.2 | 37.71 |
| Ethyl hydroxyl ethyl cellulose | 3.3 | 9.42 |
| Cellulose acetate butyrate | 3.3 | 9.42 |
| Epoxidized soy bean oil | 15.2 | 43.42 |
| Methyl ethyl ketone | 65.0 | — |
| Example 10 | | |
| Magnetic iron oxide | 11.8 | 36.87 |
| Ethyl hydroxyl ehtyl cellulose | 3.1 | 9.68 |
| Cellulose acetate butyrate | 3.0 | 9.37 |
| Epoxidized soy bean oil | 13.6 | 42.5 |
| Tri cresyl phosphate | 0.5 | 1.56 |
| Methyl ethyl ketone | | |
| Example 11 | | |
| Magnetic iron oxide | 13.5 | 36.0 |
| Ethyl hydroxyl ethyl cellulose | 4.5 | 12.0 |
| Cellulose acetate butyrate | 4.0 | 10.66 |
| Epoxidized soy bean oil | 15.0 | 40.0 |
| Tri cresyl phosphate | 0.5 | 1.33 |
| Methyl ethyl ketone | 62.5 | — |
| Example 12 | | |
| Carbon black | 5.0 | 15.32 |
| Ethyl hydroxyl ethyl cellulose | 4.6 | 14.12 |
| Cellulose acetate butyrate | 4.0 | 12.37 |
| Epoxidized soy bean oil | 18.0 | 55.3 |
| Tri cresyl phosphate | 1.0 | 3.06 |
| Methyl ethyl ketone | 67.4 | — |

Having thus described my invention, I claim:

1. A pressure sensitive image transfer medium formed of:

a planar flexible substrate film of synthetic resinous material and a transfer layer comprising the solvent evaporated residue of an applied liquid dispersion adherently secured to one surface of said substrate film and from which localized portions are selectively and fully transferable to a copy surface in response to pressure application to the obverse surface of said substrate film said layer consisting essentially of the uniformly dispersed intermixture of about 9 to 20 parts of ethyl hydroxyl ethyl cellulose as a first resinous constituent thereof, a substantially equal amount of a second resinous constituent that is incompatible with said first resinous constituent and selected from the group consisting of low to medium molecular weight methyl methacrylate and cellulose acetate butyrate, about 30 to 55 parts of a mutually incompatible non drying vehicle modifier that is non-plasticizing with either said first or second resinous constituents selected from the group consisting of epoxidized soy bean oil and lard oil and about 20 to 45 parts of image sensible material.

2. The pressure sensitive image transfer medium as set forth in claim 1 wherein said particulate image sensible material comprises finely divided magnetically sensible iron oxide.

3. The pressure sensitive image transfer medium as set forth in claim 1 including up to about 3 parts of tri cresyl phosphate for selective plasticization of said ethyl hydroxyl ethyl cellulose constituent.

4. The pressure sensitive image transfer medium as set forth in claim 1 wherein said 20 to 45 parts of image sensible material includes from 7 to 16 parts of graphite.

5. The pressure sensitive image transfer medium as set forth in claim 1 wherein said cellulose acetate butyrate resin has an average acetyl/butyryl range of from 29.5%/17.0% to 20.5%/26% respectively.

* * * * *